US009231939B1

(12) United States Patent
Morrison

(10) Patent No.: US 9,231,939 B1
(45) Date of Patent: Jan. 5, 2016

(54) INTEGRATING BUSINESS TOOLS IN A SOCIAL NETWORKING ENVIRONMENT

(71) Applicant: Google Inc., Mountain View, CA (US)

(72) Inventor: Ryan Morrison, San Francisco, CA (US)

(73) Assignee: Google Inc., Mountain View, CA (US)

( * ) Notice: Subject to any disclaimer, the term of this patent is extended or adjusted under 35 U.S.C. 154(b) by 445 days.

(21) Appl. No.: 13/648,094

(22) Filed: Oct. 9, 2012

(51) Int. Cl.
H04L 29/06 (2006.01)
G06F 21/41 (2013.01)
G06F 21/62 (2013.01)
G06Q 50/00 (2012.01)

(52) U.S. Cl.
CPC ............ *H04L 63/0815* (2013.01); *G06F 21/41* (2013.01); *G06F 21/629* (2013.01); *G06Q 50/01* (2013.01)

(58) Field of Classification Search
None
See application file for complete search history.

(56) References Cited

U.S. PATENT DOCUMENTS

| 6,130,938 | A | 10/2000 | Erb |
| 6,192,119 | B1 | 2/2001 | Wilson |
| 6,697,478 | B1 | 2/2004 | Meldrum et al. |
| 6,754,322 | B1 | 6/2004 | Bushnell |
| 7,106,848 | B1 | 9/2006 | Barlow et al. |
| 7,366,990 | B2 | 4/2008 | Pitroda |
| 7,555,110 | B2 | 6/2009 | Dolan et al. |
| 7,610,287 | B1 | 10/2009 | Dean et al. |
| 7,742,468 | B2 | 6/2010 | Vagelos |
| 2002/0137490 | A1 | 9/2002 | Gallant |
| 2002/0143874 | A1 | 10/2002 | Marquette et al. |
| 2004/0258220 | A1 | 12/2004 | Levine et al. |
| 2005/0152521 | A1 | 7/2005 | Liljestrand |
| 2006/0026288 | A1 | 2/2006 | Acharya et al. |
| 2006/0077957 | A1 | 4/2006 | Reddy et al. |
| 2006/0206604 | A1 | 9/2006 | O'Neil et al. |
| 2007/0127631 | A1 | 6/2007 | Difiglia |
| 2007/0150603 | A1* | 6/2007 | Crull et al. .................... 709/227 |
| 2007/0171898 | A1 | 7/2007 | Salva |
| 2007/0173236 | A1 | 7/2007 | Vishwanathan et al. |
| 2007/0248077 | A1 | 10/2007 | Mahle, Jr. et al. |

(Continued)

FOREIGN PATENT DOCUMENTS

WO WO02079984 10/2002

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Andrew Nalven
*Assistant Examiner* — Christopher Ruprecht
(74) *Attorney, Agent, or Firm* — Patent Law Works LLP

(57) ABSTRACT

A system and method for integrating business tools in a social networking environment. A proxy access module includes a social network application, a business registration engine, an application directory engine, an access request engine and a graphical user interface engine. The social network application receives input from a user for sharing the business tool with other members of a social network. The business registration engine receives and processes registration information for allowing access to a business tool. The application directory engine determines whether the user has permission to access the business tool. The access request engine receives and processes a request for accessing a business tool via a social network. The graphical user interface engine generates graphical data for displaying a business tool.

14 Claims, 9 Drawing Sheets

(56) References Cited

U.S. PATENT DOCUMENTS

| | | | |
|---|---|---|---|
| 2008/0056475 | A1 | 3/2008 | Brannick et al. |
| 2008/0192656 | A1 | 8/2008 | Vagelos |
| 2010/0043065 | A1* | 2/2010 | Bray et al. .................. 726/8 |
| 2010/0218128 | A1* | 8/2010 | Bonat et al. .................. 715/765 |
| 2011/0098156 | A1 | 4/2011 | Ng et al. |
| 2011/0154445 | A1* | 6/2011 | Schmidt-Karaca et al. ...... 726/4 |
| 2011/0209159 | A1* | 8/2011 | Baratz et al. .................. 718/108 |
| 2011/0209208 | A1* | 8/2011 | Quach et al. .................. 726/7 |
| 2012/0109882 | A1* | 5/2012 | Bouse et al. .................. 707/607 |
| 2012/0130794 | A1* | 5/2012 | Strieder .................. 705/14.27 |
| 2012/0198067 | A1* | 8/2012 | Weiss et al. .................. 709/226 |
| 2012/0216125 | A1* | 8/2012 | Pierce .................. 715/744 |
| 2012/0253918 | A1* | 10/2012 | Marois et al. .................. 705/14.39 |
| 2012/0290399 | A1* | 11/2012 | England et al. .................. 705/14.66 |
| 2013/0024910 | A1* | 1/2013 | Verma et al. .................. 726/3 |
| 2013/0046839 | A1* | 2/2013 | Ransom et al. .................. 709/206 |
| 2013/0066975 | A1* | 3/2013 | Kantor et al. .................. 709/205 |
| 2013/0110922 | A1* | 5/2013 | Shih et al. .................. 709/204 |
| 2013/0139241 | A1* | 5/2013 | Leeder .................. 726/9 |
| 2013/0276140 | A1* | 10/2013 | Coffing et al. .................. 726/27 |
| 2014/0025692 | A1* | 1/2014 | Pappas .................. 707/754 |
| 2014/0032656 | A1* | 1/2014 | Hyman et al. .................. 709/204 |
| 2014/0180788 | A1* | 6/2014 | George et al. .................. 705/14.41 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.
Anwar et al., "Leveraging 'Social-Network' Infrastructure to Improve Peer-to Peer Overlay Performance: Results from Orkut," University of Illinois at Urbana-Champaign USA, 2005, 9 pgs.
AT&T Personal Reach Service: Benefits and Features, Mar. 29, 2010, 7 pgs.
AT&T Personal Reach Service: Personal Reach Service, Mar. 29, 2010, 2 pgs.
Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.
Boyd, et al., "Social Network Sites: Definition, History, and Scholarship," Journal of Computer-Mediated Communication, International Communication Association, 2008, pp. 210-230.
Churchill et al., "Social Networks and Social Networking," IEEE Computer Society, Sep.-Oct. 2005, pp. 14-19.
Cohen et al., "Social Networks for Creative Collaboration," C&C '05, Apr. 12-15, 2005, London, United Kingdom, pp. 252-255.
Decker et al., "The Social Semantic Desktop," Digital Enterprise Research Institute, DERI Galway, Ireland, DERI Innsbruck, Austria, DERI Technical Report, May 2, 2004, 7 pgs.
Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.
Eagle et al., "Social Serendipity: Proximity Sensing and Cueing," MIT Media Laboratory Technical Note 580, May 2004, 18 pgs.
Erickson et al., "Social Translucence: Using Minimalist Visualizations of Social Activity to Support Collective Interaction," Designing Information Spaces: The Social Navigation Approach, Springer-verlag: London, 2003, pp. 1-19.
Gross et al., "Information Revelation and Privacy in Online Social Networks," WPES '05, Alexandria, Virginia, Nov. 7, 2005, pp. 71-80.
Hammond et al., "Social Bookmarking Tools (I)," D-Lib Magazine, Apr. 2005, vol. II, No. 4, ISSN 1082-9873, 23 pgs.
Heer et al., "Vizster: Visualizing Online Social Networks," University of California, Berkeley, Oct. 23, 2005, 8 pgs.
International Search Report, International Application No. PCT/US2008/005118, Sep. 30, 2008, 2 pgs.
Leonard, "You Are Who You Know," Internet, retrieved at http://www.salon.com, Jun. 15, 2004, 15 pgs.
LiveJournal, "FAQ #163: How Do I Find a Syndicated Account?" Last Updated: thebubba, Jan. 6, 2004, 2 pgs.
Marwick, "Selling Your Self: Online Identity in the Age of a Commodified Internet," University of Washington, 2005, 192 pgs.
MediaSift Ltd., DataSift: Realtime Social Data Mining Platform, Curate and Data Mine the Real Time Web with DataSift, Dedipower, Managed Hosting, [Retrieved on May 13, 2011], 1 pg.
Metcalf et al., "Spatial Dynamics of Social Network Evolution," 23rd International Conference of the System Dynamics Society, Jul. 19, 2005, pp. 1-13.
Mori et al., "Real-world Oriented Information Sharing Using Social Networks," Group '05, Sanibel Island, Florida, USA, Nov. 6-9, 2005, pp. 81-84.
Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.
Neumann et al., "Semantic social network portal for collaborative online communities," Journal of European Industrial Training, 2005, Emerald Group Publishing, Limited, vol. 29, No. 6, pp. 472-487.
O'Murchu et al., "Online Social and Business Networking Communities," Digital Enterprise Research Institute DERI Technical Report, National University of Ireland, Aug. 11, 2004, 22 pgs.
Ring Central, Inc., Internet, retrieved at http://www.ringcentral.com, Apr. 19, 2007, 1 pg.
Singh et al., "CINEMA: Columbia InterNet Extensible Multimedia Architecture," Department of Computer Science, Columbia University, May 2002, pp. 1-83.
Steen et al., "Development of we-centric, context-aware, adaptive mobile services requires empathy and dialogue," Freeband FRUX, Oct. 17, 2005, Internet Journal, Netherlands, pp. 1-4.
Superfeedr Track, Internet, retrieved at http://blog.superfeedr.com/track/filter/xmpp/pubsubhubbub/track, May 13, 2011, 8 pgs.
Twitter Blog: Tracking Twitter, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
Van Eijk et al., "We-centric, context-aware, adaptive mobile service bundles," Freeband, Telematica Instituut, TNO telecom, Nov. 30, 2004, 48 pgs.
Wenger et al., "Technology for Communities," CEFRIO Book Chapter v 5.2, Jan. 18, 2005, pp. 1-15.

* cited by examiner

INTEGRATING BUSINESS TOOLS IN A SOCIAL NETWORKING ENVIRONMENT

BACKGROUND

The specification relates to methods and systems for providing business tools in a personal social networking environment.

Over the last decade, social networking has become increasingly popular. For many, logging into or checking a social networking online service is at least a daily routine. Social networking online services provide tools for socializing and connecting with people who share interests and activities. In addition to an account for accessing the social network, a person may have numerous accounts for accessing a number of other tools for personal or business. It is desirable to minimize the number of accounts the user has to log into. As a result, what is needed is a method for providing access to business tools in a social networking environment.

SUMMARY

In general, one innovative aspect of the subject matter described in this disclosure may be embodied in methods that include receiving, with one or more processors, a request for allowing a user with a personal account on a social network to also access a business account on the social network, generating, with the one or more processors, an association between the user's personal account and the business account on the social network, providing the user with access to the business account on the social network and providing the user with access to a subset of applications associated with the business account based on an access level. Other implementations of one or more of these aspects include corresponding systems, apparatus, and computer programs, configured to perform the actions of the methods, encoded on computer storage devices.

These and other implementations may each optionally include one or more of the following features. For instance, the operations further include: generating a relationship between the user and other members of the social network and sharing at least one of the applications with at least one of the other members of the social network; sending authentication information and a request for data to an application server and receiving a response that indicates successful authentication and includes the data; transmitting a request to the application server to associate the user from the social network with the subset of applications, receiving an access token from the application server and associating the access token with the user. For instance, the features include at least one of the application being for distributing advertisements in the social network; at least one of the applications being a management tool for analyzing a business page on the social network; the authentication information being sent to the application server including the access token; and the access level being determined based on whether the user is an employee or an affiliate of the business.

These operations are advantageous because they provide a seamless way for integrating personal and business interests on a social network and avoid the need to log-out and reauthenticate to access the business page.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

The specification describes a system and method for integrating business tools into a social network. A proxy access module associates a user of the social network with one or more business tool accounts. The proxy access module generates a user interface that includes permission settings and transmits a collection of data that includes the user interface to an administrator associated with the business. The administrator accesses the user interface to provide permission for the user to access the one or more business tool accounts. The administrator accesses the user interface to change permission settings.

In some instances, the proxy access module receives a request for allowing the user of the social network to access an application that generates a business tool associated with the business. For example, the application can be for distributing ads in the social network or tracking the number of social network users that have interacted with a business page in the social network. The proxy access module transmits both data including a social network and the business tool to the user. In one instance, the user shares the business tool with other members of the social network, such as members that are part of a group within the social network. In another instance, the proxy access module sends authentication information to the application server and receives a response that indicates successful authentication before transmitting the graphical data for displaying the business tool to the user. In yet another instance, the proxy access module receives input indicating that the user selected a link and generates a redirect action that includes a uniform resource locator and a session identifier for forwarding the user to an online service.

Figure 1:
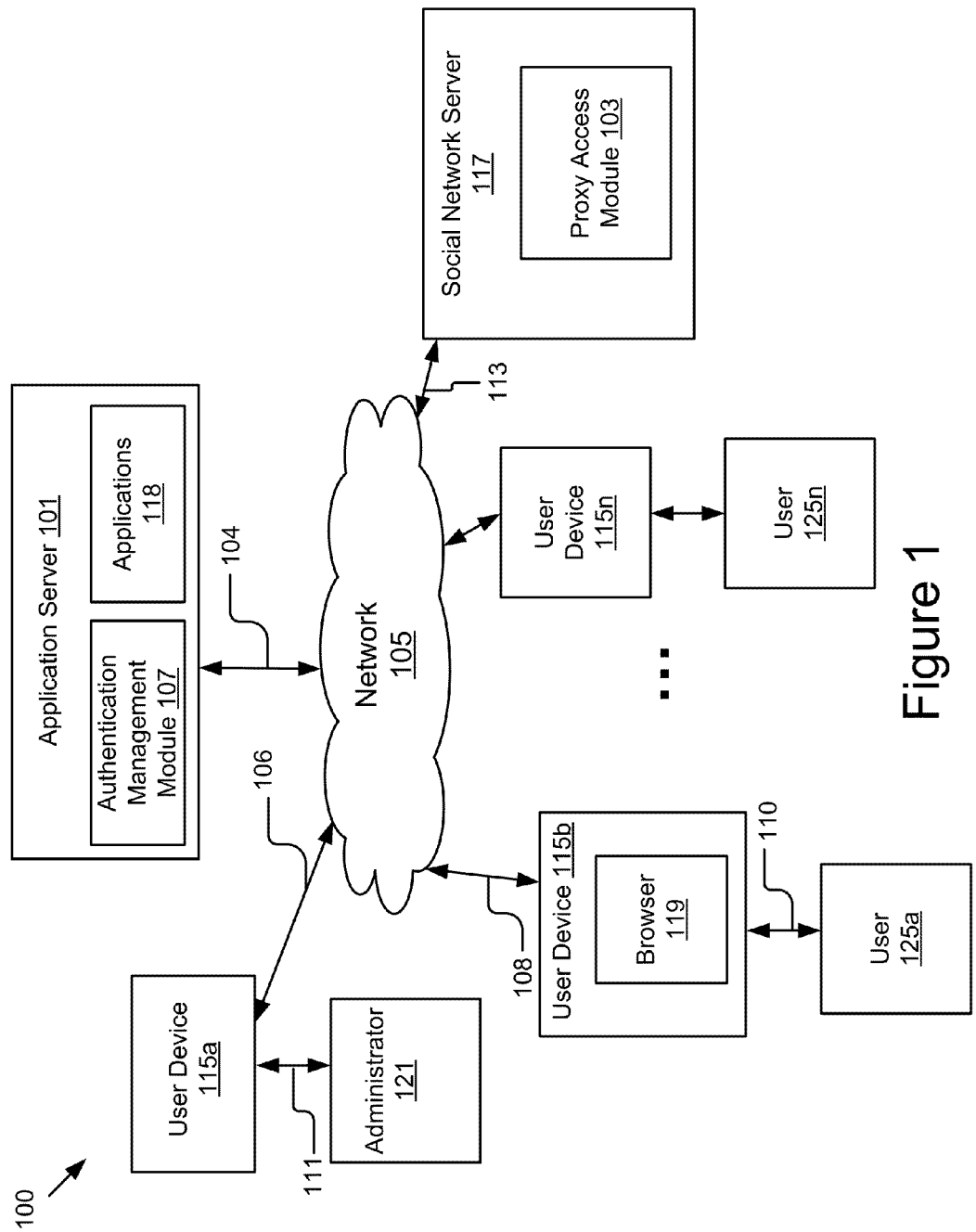
FIG. 1 is a high-level block diagram illustrating an example system for integrating business tools into a social network environment.

FIG. 1 illustrates a block diagram of an example system 100 for integrating business tools into a social network environment. The illustrated description of the system 100 includes user devices 115a, 115b . . . 115n that access the network 105 via signal lines 106, 108, that can be accessed by an administrator 121 and other users 125a . . . 125n via signal lines 111, 110. The system also includes an application server 101 and a social network server 117. In the illustrated instance, these entities are communicatively coupled via a network 105. In FIG. 1 and the remaining figures, a letter after a reference number, such as "115a" is a reference to the element having that particular reference number. A reference number in the text without a following letter, such as "115," is a general reference to any or all instances of the element bearing that reference number. In the illustrated instance, these entities are communicatively coupled via a network 105. While only one network 105 is coupled to the user devices 115a, 115b . . . 115n, the application server 101 and the social network server 117, in practice any number of networks 105 can be connected to the entities.

The network 105 can be a conventional type, wired or wireless, and may have any number of configurations such as a star configuration, token ring configuration or other configurations. Furthermore, the network 105 may comprise a local area network (LAN), a wide area network (WAN) (e.g., the Internet), and/or any other interconnected data path across which multiple devices may communicate. In yet another instance, the network 105 may be a peer-to-peer network. The network 105 may also be coupled to or includes portions of a telecommunications network for sending data in a variety of different communication protocols. In yet another instance, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

The user devices 115a, 115b . . . 115n in FIG. 1 are used by way of example. While FIG. 1 illustrates three user devices, the specification applies to any system architecture having any number of user devices 115n. The user device 115 can be any computing device that includes a memory and a processor, such as a personal computer, a laptop, a smartphone, a cellular phone, a personal digital assistant (PDA), a tablet computer, a portable game player, a portable music player, a television with one or more processors embedded therein or coupled thereto or any other electronic device capable of accessing a network 105.

An administrator 121 manages permission data by accessing the user device 115a via signal line 111. For example, an administrator 121 provides permission for a user 125 to access applications 118 associated with a business tool account. The authentication management module 107 receives a request to grant access from the administrator 121. The authentication management module 107 registers the user 125 with the business tool account with a proxy access module 103. Once the business tool account access has been registered with the proxy access module 103, a user 125 can access applications 118 via a business tool account that may be housed by the social network server 117.

A user 125a accesses user device 115b via signal line 110. The user 125a interacts with a browser 119 stored on the user device 115b. The browser 119 can be code for rendering a webpage generated by the social network server 117. For example, the user 125a accesses applications 118 that are integrated into the business tool account using the browser 119.

The business tool can be a management tool for managing or analyzing a business page on the social network. For example, a business page for social media communication for a company or a brand associated with the company can be managed by an administrator 121 on the social network. The business tool provides monitoring applications to analyze and understand activities associated with the business page. In one instance, the business tool analyzes messages or posts on the business page. For example, the business tool analyzes how many users 125 of a social network the message or post reaches. In one instance, the number of users 125 can be based on a number of users 125 following the business page and/or the number of users 125 that share or reshare the message. In another instance, the business tool analyzes prominent or influential users 125 that share or reshare the message or post.

In some instances, the business tool analyzes the popularity of a business page or content associated with the business page when users 125 recommend the business page. In another instance, the business tool analyzes users 125 that interact with the business page. For example, the business tool analyzes users' 125 demographics for users 125 that share, comment or recommend the business page or content associated with the business page.

In one instance, the application server 101 includes an authentication management module 107 and applications 118. The authentication management module 107 registers with a social network server 117 to provide applications 118 or application data to the social network that can be incorporated into business tool accounts. In some instances, the application server 101 performs data processing for the applications 118 and frequently transmits updates to the social network server 117. In the illustrated example, the application server 101 can be coupled to the network 105 via signal line 104.

The social network server 117 includes a proxy access module 103 that generates a social network, manages user 125 access to the business tool accounts and generates graphical data for displaying data from the applications 118. In some instances, the proxy access module 103 authenticates applications 118 from the application server 101 and incorporates the applications 118 into business tool accounts. In some instances, the application server 101 and the social network server 117 can be one server. The social network server 117 is coupled to the network 105 via signal line 113.

Figure 2:
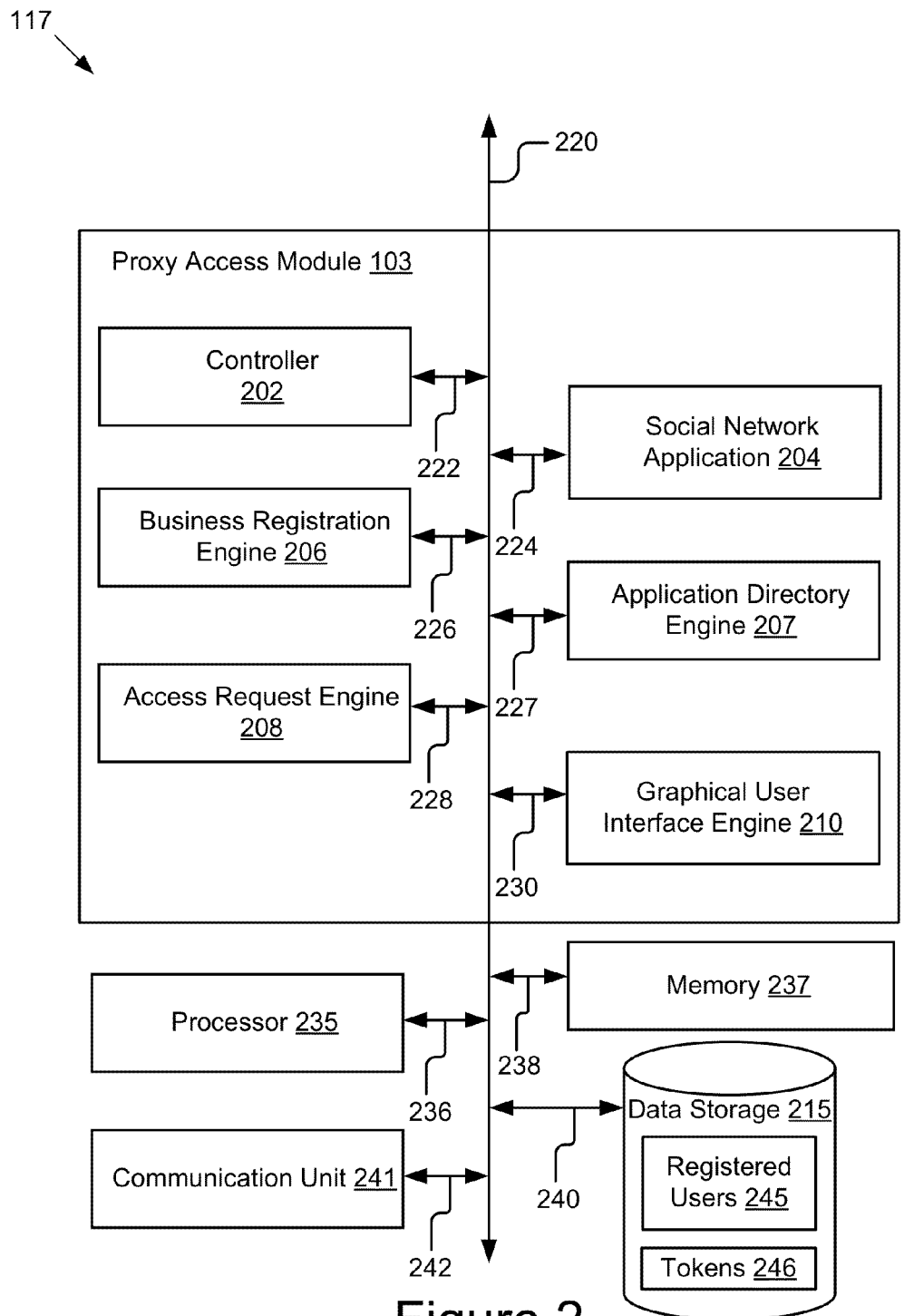
FIG. 2 is a block diagram illustrating an example proxy access module.

Referring now to FIG. 2, the proxy access module 103 is shown in more detail. FIG. 2 is a block diagram of a social network server 117 that includes the proxy access module 103, a memory 237, data storage 215, a processor 235 and a communication unit 241.

The processor 235 may be any general-purpose processor. The processor 235 comprises an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. Other processors, operating systems, sensors, displays and physical configurations can be possible.

The memory 237 stores instructions and/or data that may be executed by processor 235. The memory 237 is coupled to the bus 220 for communication with the other components via signal line 238. The instructions and/or data may comprise code for performing any and/or all of the techniques described herein. The memory 237 may be a dynamic random access memory (DRAM) device, a static random access memory (SRAM) device, flash memory or some other memory device known in the art. In one instance, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 241 receives data from an application server 101 or a user device 115a, 115b . . . 115n. The communication unit 241 transmits the data to the proxy access module 103. The communication unit 241 can be coupled to the bus 220 via signal line 242. In some instances, the communication unit 241 includes a port for direct physical connection to the network 105 or to another communication channel. For example, the communication unit 241 includes a USB, SD, CAT-5 or similar port for wired communication with the network 105. In some instances, the communication unit 241 includes a wireless transceiver for exchanging data with the network 105, or with another communication channel, using one or more wireless communication methods, such as IEEE 802.11, IEEE 802.16, BLUETOOTH®, near field communication (NFC) or another suitable wireless communication method. In other instances, the communication unit 241 includes a NFC chip that generates a radio frequency (RF) for short-range communication.

The data storage 215 can be a non-transitory memory that stores data necessary for the functionality of the proxy access module 103. The data storage 215 is communicatively coupled by the bus 220 for communication with the other components of the social network server 117 via signal line 240. The data stored in the storage 215 includes registered users 245 and tokens 246. The registered user 245 can be a list (or a database) of users 125 that may be associated with business tool accounts and applications in the social network. Tokens 246 can be a list (or a database) of access tokens for authenticating and accessing accounts.

In one instance, the proxy access module 103 comprises a controller 202, a social network application 204, a business registration engine 206, an access request engine 208, an application directory engine 207 and a graphical user interface engine 210 that are each coupled to the bus 220.

The controller 202 can be software including routines for receiving information and routing the information to the appropriate engine. In one instance, the controller 202 can be a set of instructions executable by the processor 235 to provide the functionality described below for integrating business tools in a social environment. In another instance, the controller 202 can be stored in the memory 237 of the social network server 117 and can be accessible and executable by the processor 235. In either instance, the controller 202 can be adapted for cooperation and communication with the processor 235, the memory 237, the social network application 204, the business registration engine 206, the access request engine 208, the application directory engine 207, the graphical user interface engine 210 and other components of the social network server 117 via the bus 220. The controller 202 is coupled to the bus 220 for communication with the other components via signal line 222.

The controller 202 receives data and transmits the data to the appropriate component. For example, the controller 202 receives a request from an application server 101 to register an application and create an account for accessing the application. The controller 202 transmits the request to the business registration engine 206 to begin the registration process. In another example, the controller 202 receives a request from a user 125 to access the account. The controller 202 can transmit the information via a communication unit 241.

The social network application 204 can be software including routines for generating and managing a social network. In one instance, the social network application 204 can be a set of instructions executable by the processor 235 to provide the functionality described below for generating and managing a social network. In another instance, the social network application 204 can be stored in the memory 237 of the social network server 117 and can be accessible and executable by the processor 235. In either instance, the social network application 204 can be adapted for cooperation and communication with the processor 235, the data storage 215, the controller 202, the access request engine 208, the application directory engine 207, the graphical user interface engine 210 and other components of the social network server 117 via bus 220. The social network application 204 is coupled to the bus 220 for communication with the other components via signal line 224.

The social network application 204 manages a social network by registering users 125 for personal accounts on the social network, generating content for posting in the social network on both personal and business accounts (e.g. text, photos, videos, check-ins, etc.), managing comments, managing indications of acknowledgement (approval, disapproval, like, dislike, thumbs up, thumbs down), managing groups, etc.

The social network application 204 records the relationships between people in a social graph. For example, where a first user 125 follows a second user 125, the first user 125 has a first-degree relationship with the second user 125. If the second user 125 follows a third user 125 that the first user 125 does not follow, the first user 125 has a second-degree relationship with the third user 125.

In some instances, a user 125 shares a business tool with other members of a social network. The social network application 204 receives input from a user 125 for sharing the business tool with other members of the social network. The social network application 204 transmits instructions to a business registration engine 206 for associating the business tool with other members of the social network and the social network application 204 generates a notification for the user 125 to let the user 125 know of the association. In some instances, the social network application 204 transmits instructions to the graphical user interface engine 210 to generate graphical data for displaying a portal for accessing the business tool.

The business registration engine 206 can be software including routines for managing the business tools account. In one instance, the business registration engine 206 can be a set of instructions executable by the processor 235 to provide the functionality described below for receiving and processing registration information for allowing access to a business tool by one or more users 125. In another instance, the business registration engine 206 can be stored in the memory 237 of the social network server 117 and can be accessible and executable by the processor 235. In either instance, the business registration engine 206 can be adapted for cooperation and communication with the processor 235 and other components of the social network server 117 via bus 220. The business registration engine 206 is coupled to the bus 220 for communication with the other components via signal line 226.

In some instances, the business registration engine 206 receives a request for allowing a user 125 with a personal account on a social network to also access a business tool account on the social network. For example, the business registration engine 206 receives the request from an administrator 121 that manages the business tool account on the social network. In some instances, the request can be received from another user 125 that shares a business tool and/or access to the business tool account with the user 125 on the social network.

In some instances, the business registration engine 206 maintains the business tools account and distributes payments through the account. For example, when an administrator 121 purchases an application 118 from the application server 101, the business registration engine 206 pays for the application 118. In some other instances, the business registration engine 206 pays users 125 in the social network to promote the business.

In some instances, an administrator 121 instructs the business registration engine 206 to give access to a business tools account to users 125 in the social network. For example, the administrator 121 created the business tools account for Company X, but the administrator 121 does not have enough time to manage all aspects of the business tools account. As a result, the administrator 121 designates other users 125 in the social network as having permission to manage the business tools account. As a result, the business registration engine 206 associates the users' 125 personal accounts with the business tools account (including the token) and updates the registered users file 245 in data storage 215. In some instances, the business registration engine 206 issues a token for each user 125 that is associated with an application 118. In some other instances, the business registration engine 206 provides the user 125 with the token issued by the authentication management module 107 on the application server 101.

In some instances, the administrator 121 specifies the permissions available to the other users 125. For example, the other users 125 can use the business tools and they can create posts on behalf of Company X in the social network, but the other users 125 cannot download new applications 118 from the application server 101 or delete the business tools account. In some instances, the administrator 121 can specify that a user 125 has permission to access a subset of the applications 118. For example, the user 125 can view a web analytics tools that shows a number of indications of approval received for the business tools account, but the user 125 cannot manage a business tool for offering deals to other members of the social network.

In some instances, the administrator 121 instructs the business registration engine 206 to associate users 125 with the business tools account that may not be employees of the business but have some affiliation. For example, the business registration engine 206 associates an advertising business tool with the user 125 where the user 125 can be paid by the business registration engine 206 to host advertisements on the user's 125 personal profile page on the social network or a website outside of the social network. In another example, the business registration engine 206 rewards the user 125 for referring other users 125 in the social network to purchase goods or services from the business using an advertising business tool. For example, the advertising business tool includes a token that can be unique for each user 125 and stored in data storage 215 in a token file 246. A first user 125 gives the token to other users 125 in the social network that use the token at checkout, and the first user 125 receives a reward from the business registration engine 206 each time the token is used. In another variation, the advertising business tool generates a unique link for a product such that when a first user 125 posts the link to the first user's 125 personal profile page and other users 125 click on the link, the first user 125 receives a reward from the business registration engine 206.

The application directory engine 207 can be software including routines for receiving and processing a request for a list of business tools accessible to a user 125 on a social network. In one instance, the application directory engine 207 can be a set of instructions executable by the processor 235 to provide the functionality described below for receiving and processing a request for a list of business tools. In another instance, the application directory engine 207 can be stored in the memory 237 of the social network server 117 and can be accessible and executable by the processor 235. In either instance, the application directory engine 207 can be adapted for cooperation and communication with the processor 235 and other components of the social network server 117 via bus 220. The application directory engine 207 is coupled to the bus 220 for communication with the other components via signal line 227.

The application directory engine 207 associates an administrator 121 and other users 125 with applications 118 received from the application server 101 and stores the association in the registered users file 245. The application directory engine 207 also updates the registered users file 245 in response to receiving additional information, for example, in response to a request from the administrator 121. In some instances, when a user 125 attempts to access a business tool, the application directory engine 207 compares the user's 125 identifying information with the registered users file 245 to determine if the user 125 is authorized to access the business tool. If the user 125 has permission to access the business tool, the application directory engine 207 instructs the graphical user interface engine 210 to generate graphical data for displaying the business tool if the business tool is hosted by the social network server 117 or a portal if the business tool is hosted by the application server 101. In some instances, the user 125 may have permission to access a subset of business tools associated with a business tool account on the social network. The graphical user interface engine 210 may generate graphical data for displaying the subset of business tools.

In some instances, the application directory engine 207 receives a token from the user 125 when the user 125 attempts to access a business tool and the application directory engine 207 compares the token with the tokens 246 included in data storage 215.

The access request engine 208 can be software including routines for receiving and processing a request for accessing a business tool account via a social network. In one instance, the access request engine 208 can be a set of instructions executable by the processor 235 to provide the functionality described below for receiving and processing a request for accessing a business tool account. In another instance, the access request engine 208 can be stored in the memory 237 of the social network server 117 and can be accessible and executable by the processor 235. In either instance, the access request engine 208 can be adapted for cooperation and communication with the processor 235 and other components of the social network server 117 via bus 220. The access request engine 208 is coupled to the bus 220 for communication with the other components via signal line 228.

In some instances, the access request engine 208 receives a request from a user 125 to access a business tool account. For example, a user 125 clicks on a tools icon on the user interface for the business tool profile in the social network. The access request engine 208 compares the user's 125 information to registered users 245 and if the user 125 is not a registered user 245, the access request engine 208 denies access to the user 125. For example, the access request engine 208 instructs the graphical user interface engine 210 to generate graphical data that states "I'm sorry, but you do not have permission to access this business account," or simply "Access denied."

If the user 125 is a registered user 245, the access request engine 208 instructs the graphical user interface engine 210 to generate graphical data for displaying the business tool account information that the user 125 is allowed to access. In some instances, the user 125 may have permission to access a subset of business tools associated with a business tool account on the social network. The access request engine 208 may instruct the graphical user interface engine 201 to generate graphical data for displaying the subset of business tools associated with the business tool account. In some instances, the access may be based on an access level. For example, the access level may be based on whether the user 125 is an employee or an affiliate of the business. When the application 118 is housed on the application server 101, the access request engine 208 generates a portal for accessing the application 118 and instructing the graphical user interface engine 210 to generate graphical data related to the application 118 that seamlessly integrates the application 118 with the social network.

The graphical user interface engine 210 can be software including routines for generating a user interface. In one instance, the graphical user interface engine 210 can be a set of instructions executable by the processor 235 to provide the functionality described below for generating the user interface for displaying a portal for accessing a business tool. In another instance, the graphical user interface engine 210 can be stored in the memory 237 of the social network server 117 and can be accessible and executable by the processor 235. In either instance, the graphical user interface engine 210 can be adapted for cooperation and communication with the processor 235 and other components of the social network server 117 via bus 220. The graphical user interface engine 210 is coupled to the bus 220 for communication with the other components via signal line 230.

The graphical user interface engine 210 receives a request to access a business tool and generates graphical data for displaying the business tool or displaying a portal for accessing the business tool, depending on which server hosts the business tool. The portal contains one or more access elements for accessing one or more business tools. An access element can be one or more of a link or self-executing content or code. The link provides a connection to an online service that includes a business tool. In one instance, the self-executing content or code can be a widget embedded in the portal. In another instance, the graphical user interface engine 210 generates html or xml that is sent to user device 115. The graphical user interface engine 210 sends the collection of data to an application (e.g., a browser 119) in the user device 115 causing the application to display the portal via a user interface.

In some instances, the graphical user interface engine 210 generates graphical data for displaying a page of available business tools. For example, the authentication management module 107 on the application server 101 registers the applications 118 with the application directory engine 207 and provides information about the applications 118, for example, titles and brief summaries. In some instances, the application directory engine 207 provides the graphical user interface engine 210 with statistics about the number of business tool accounts that use the application 118 that the graphical user interface engine 210 incorporates into the page of available business tools.

Figure 3:
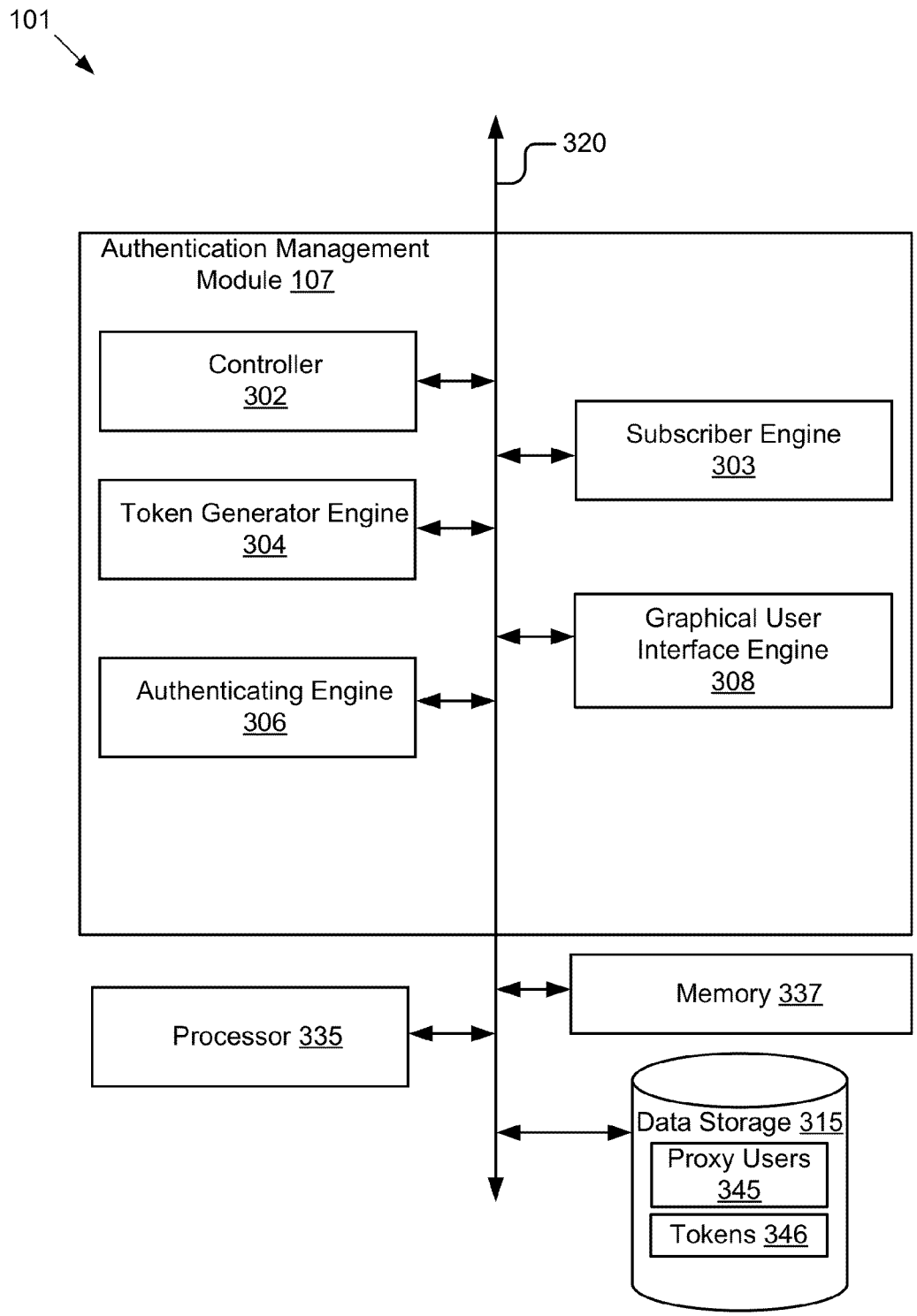
FIG. 3 is a block diagram illustrating an example authentication management module.

Referring now to FIG. 3, the authentication management module 107 is shown in more detail. FIG. 3 is a block diagram of an application server 101 that includes the authentication management module 107, a memory 337, data storage 315 and a processor 335.

Similar to the description of the social network server 117 of FIG. 2, the processor 335 may be any general-purpose processor. The processor 335 comprises an arithmetic logic unit, a microprocessor, a general purpose controller or some other processor array to perform computations and provide electronic display signals to a display device. The processor 335 is coupled to the bus 320 for communication with the other components. Processor 335 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. The processing capability may be limited to supporting the display of images and the capture and transmission of images. The processing capability might be enough to perform more complex tasks, including various types of feature extraction and sampling. Other processors, operating systems, sensors, displays and physical configurations can be possible.

The memory 337 stores instructions and/or data that may be executed by processor 335. The memory 337 is coupled to the bus 320 for communication with the other components. The instructions and/or data may comprise code for performing any and/or all of the techniques described herein. The memory 337 may be a dynamic random access memory (DRAM) device, a static random access memory (SRAM) device, flash memory or some other memory device known in the art. In one instance, the memory 337 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The data storage 315 can be a non-transitory memory that stores data necessary for the functionality of the authentication management module 107. The data storage 315 is communicatively coupled by the bus 320 for communication with the other components of the application server 101. The data stored in the data storage 315 includes proxy users 345 and tokens 346. The proxy users 345 can be a list (or a database) of users 125 of a social network that have access to accounts of business tools stored in applications 118. If there is only one application server 101, the registered users 245 in the social network server 117 should match the proxy users 345. If there are multiple application servers 101, the proxy users 345 can be a subset of the registered users 245. Tokens 346 can be a list (or a database) of access tokens for authenticating and accessing accounts.

In one instance, the authentication management module 107 comprises a controller 302, a token generator engine 304, a subscriber engine 303, an authenticating engine 306 and a graphical user interface engine 308 that are each coupled to the bus 320.

The controller 302 can be software including routines for receiving information and routing the information to the appropriate engine. In one instance, the controller 302 can be a set of instructions executable by the processor 335 to provide the functionality described below for authenticating access to a business tool. In another instance, the controller 302 can be stored in the memory 337 of the application server 101 and can be accessible and executable by the processor 335. In either instance, the controller 302 can be adapted for cooperation and communication with the processor 335, the memory 337, the token generator engine 304, the subscriber engine 303, the authenticating engine 306, the graphical user interface engine 308 and other components of the application server 101 via the bus 320.

In some instances, the controller 302 receives a request from the social network server 117 for an application 118. The controller 302 transmits the application 118 to the social network server 117 via a communication unit (not shown). In examples where the application server 101 hosts the applications 118, the controller 302 receives a request from the social network server 117 or directly from a user device 115 to perform operations for the application 118. The controller 302 transmits the request to the authenticating engine 306 to determine whether the requestor has permission to make the request.

The subscriber engine 303 can be software including routines for registering an application 118 for providing a business tool with a social network for access by a user 125 of the social network. In one instance, the subscriber engine 303 can be a set of instructions executable by the processor 335 to provide the functionality described below for registering an application 118. In another instance, the subscriber engine 303 can be stored in the memory 337 of the application server 101 and can be accessible and executable by the processor 335. In either instance, the subscriber engine 303 can be adapted for cooperation and communication with the processor 335, the memory 337 and other components of the application server 101 via the bus 320.

In some instances, the subscriber engine 303 provides the application directory engine 207 with identifying information for the application 118 for registration with the social network. For example, the subscriber engine 303 provides a URL where the application 118 may be available for download, an email address for an administrator 121 that may be responsible for managing the application server 101, a name for the application 118, a brief description of the application, etc.

The token generator engine 304 can be software including routines for generating access tokens that contain information to authenticate access to applications 118. In one instance, the token generator engine 304 can be a set of instructions executable by the processor 335 to provide the functionality described below for generating access tokens. In another instance, the token generator engine 304 can be stored in the memory 337 of the application server 101 and can be accessible and executable by the processor 335. In either instance, the token generator engine 304 can be adapted for cooperation and communication with the processor 335, the memory 337 and other components of the application server 101 via the bus 320.

The token generator engine 304 generates a token for each application 118. In some instances, the token generator engine 304 generates a unique token for each user 125 that accesses the application 118 and maintains a list of tokens 346 in the data storage 315 that can be updated. For example, when a user 125 no longer has permission to access an application 118, the token generator engine 304 adds the user 125 to a blacklist and/or revokes the user's 125 token. In some instances, the proxy access module 103 provides the token generator engine 304 with a token for users 125 that may be associated with applications 118 and the token generator engine 304 updates the tokens file 346.

The authenticating engine 306 can be software including routines for receiving and processing login attempts to access business tools. In one instance, the authenticating engine 306 can be a set of instructions executable by the processor 335 to provide the functionality described below for authenticating login attempts. In another instance, the authenticating engine 306 can be stored in the memory 337 of the application server 101 and can be accessible and executable by the processor 335. In either instance, the authenticating engine 306 can be adapted for cooperation and communication with the processor 335, the memory 337 and other components of the application server 101 via the bus 320.

In some instances, the authenticating engine 306 receives identifying information from the access request engine 208 for a user 125 trying to access an application 118 via a portal. The authenticating engine 306 compares a token in the identifying information to the tokens file 346 to determine whether the user 125 has permission to access the application 118. In some instances, the authenticating engine 306 compares the identifying information to the proxy users file 345. If the user 125 has permission to access the application 118, the authenticating engine 306 allows the user 125 to access the application 118. If the user 125 does not have permission to access the application 118, the authenticating engine 306 denies access.

The graphical user interface engine 308 can be software including routines for generating a user interface. In one instance, the graphical user interface engine 308 can be a set of instructions executable by the processor 335 to provide the functionality described below for generating the user interface for receiving information from an administrator 121 to register an application with a social network. In another instance, the graphical user interface engine 308 can be stored in the memory 337 of the application server 101 and can be accessible and executable by the processor 335. In either instance, the graphical user interface engine 308 can be adapted for cooperation and communication with the processor 335 and other components of the application server 101 via bus 320.

Figure 4:
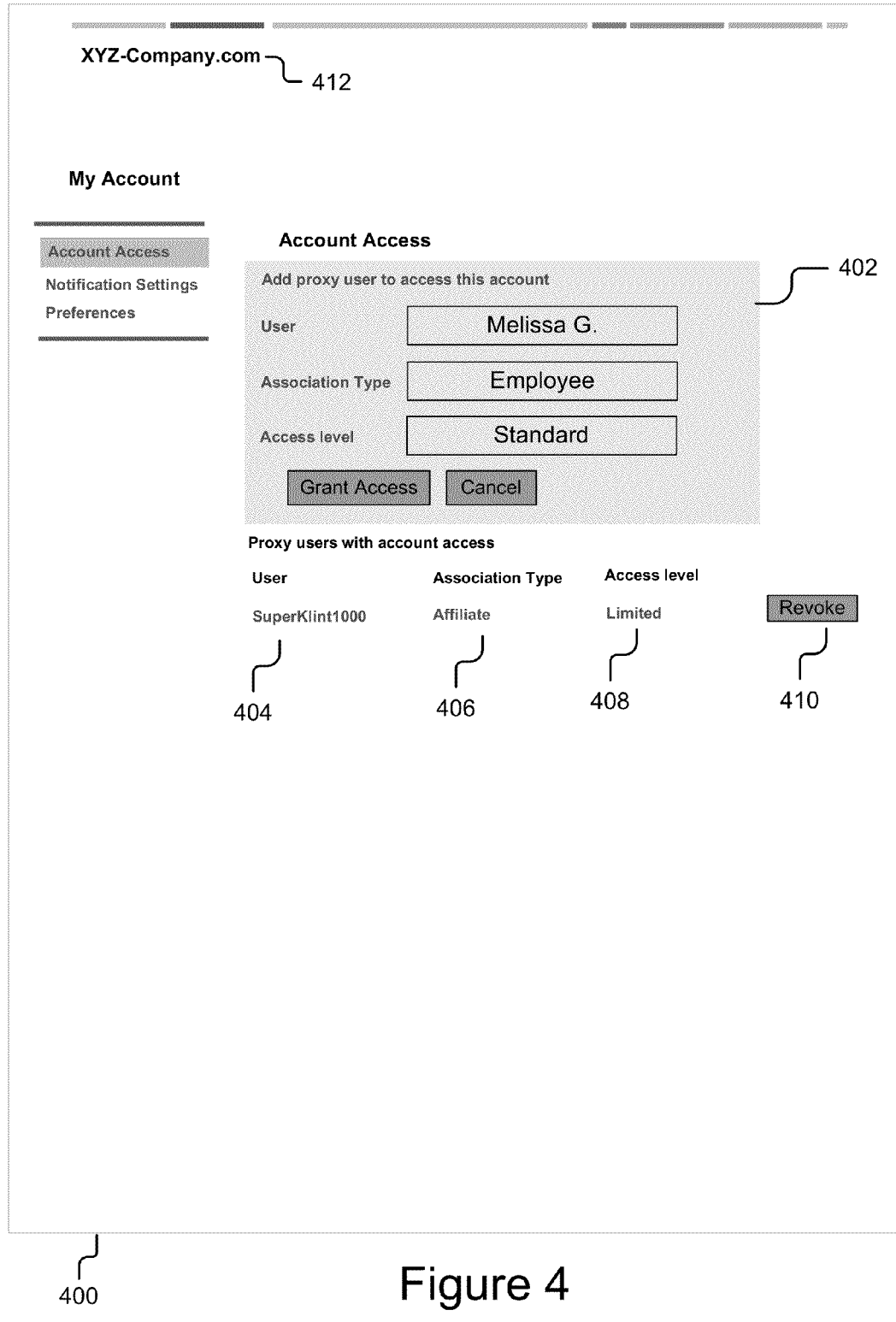
FIG. 4 is a graphic representation of an example user interface for providing permission for a user to accesses a business tool account.

Turning now to FIG. 4, one example of a graphic representation of a user interface 400 generated by the graphical user interface engine 210 is illustrated. The user interface 400 displays a form 402 that collects information. An administrator 121 inputs information into the form 402 to register the account with the business registration engine 206, which then provides a user 125 of the social network with access to a business tool account 412. In this example, form 402 includes inputs for user information, such as a user name, an association type and an access level.

Further, the user interface 400 includes a list of users 125 that the administrator 121 previously permitted to access the business tools account. The list of users 125 includes a username 404 of the user 125 in the social network, an association type 406 that describes whether the user 125 may be an employee, an affiliate, etc. and an access level 408 for the user 125. In some instances, the access level 408 dictates whether the user 125 has access to all business tools or whether some business tools may be restricted because some business tools include sensitive information. The list also includes a button 410 for revoking access permission. In some instances, the administrator 121 updates the user interface 400 to change permission settings. For example, the administrator 121 changes the access level 408 from one value to another value.

Figure 5:
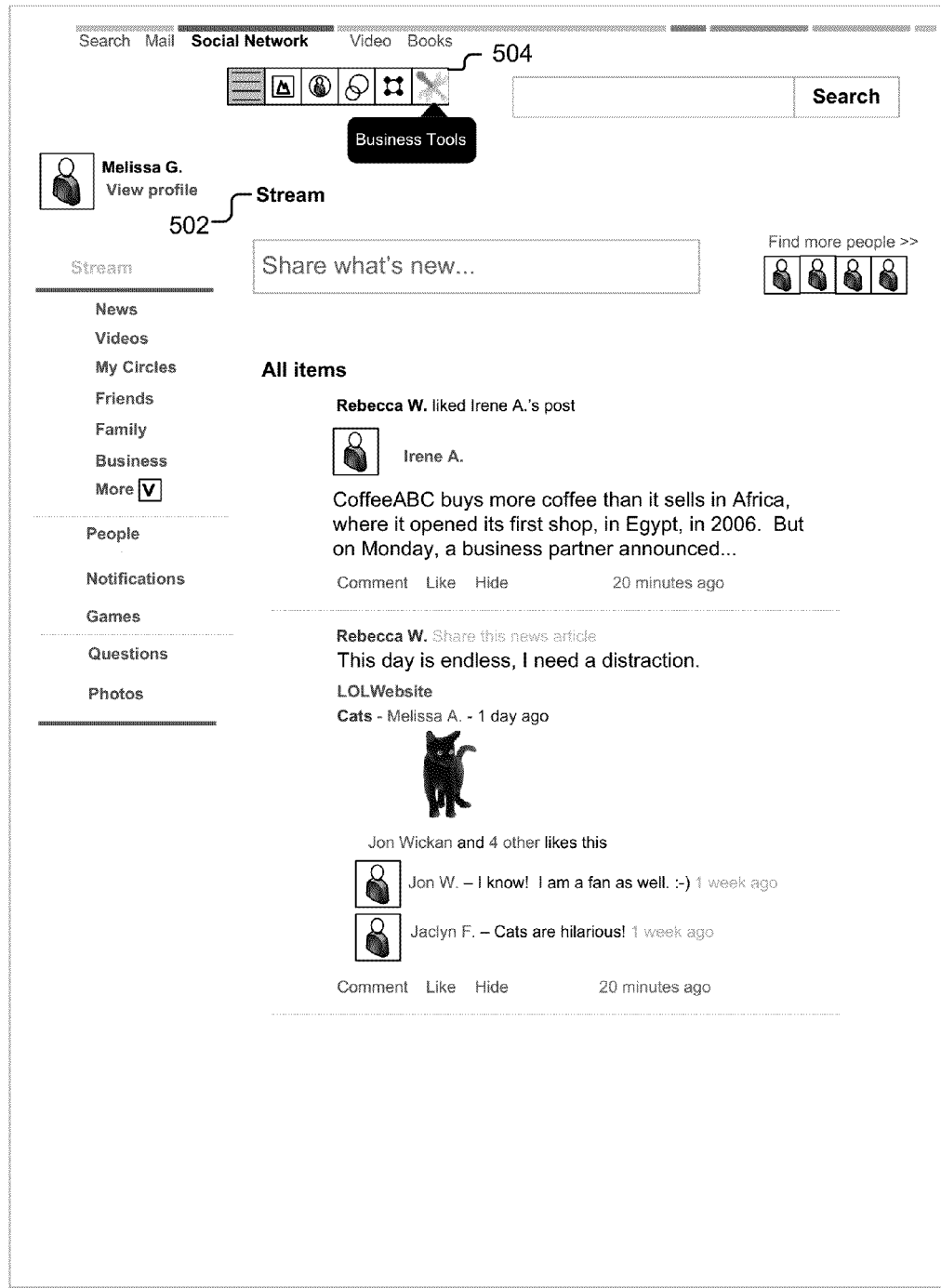
FIG. 5 is a graphic representation of an example stream of content.

Turning now to FIG. 5, one example of a graphic representation of a user interface 500 generated by the graphical user interface engine 210 is illustrated. The user interface 500 displays a stream 502 of social activity for a user 125 on a social networking online service. In this example, the social networking online service includes a link or icon 504 for viewing one or more business tools accounts that the user 125 may be permitted to use. Having a business tools account that is integrated into the user's 125 personal social network account is advantageous because the user 125 has access to the business tools without having to manually log into the corporate account for the tools on the social network. Therefore, the social networking online service provides access to business tools in a single sign-in step. In addition to personal or social activities on the social networking online service, the user 125 has access to business tools associated with a company that the user 125 may be employed by or a company owned by the user 125.

In some instances, the user 125 accesses a business tool that provides monitoring services to analyze and understand activities associated with the business page in the social network. The business tool analyzes messages or posts on the business page. For example, the business tool analyzes how many users 125 of a social network the message or post reaches. In another instance, the user 125 accesses a business tool that provides analysis of how the popularity of a business page or content associated with the business page changes when users 125 recommend the business page. In yet another instance, the business tool analyzes users 125 that interact with the business page. For example, the business tool analyzes users' 125 demographics of users 125 that share, comment or recommend the business page or content associated with the business page.

Figure 6A:
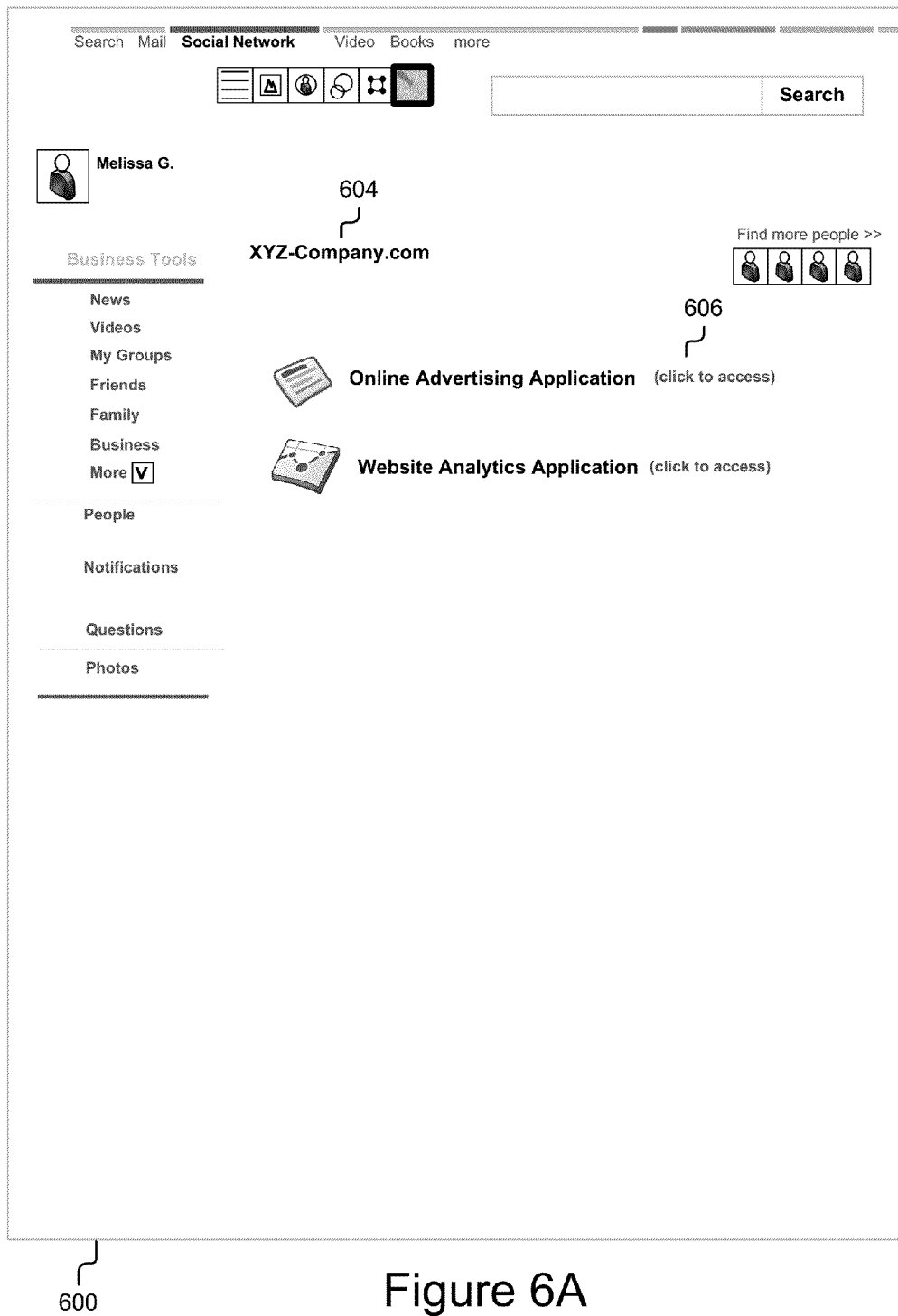
FIG. 6A is a graphic representation of an example portal.

Turning now to FIG. 6A, one example of a graphic representation of user interface 600 generated by the graphical user interface engine 210 is illustrated. The user interface 600 displays a page for the company 604 that includes links for accessing business tools associated with the company 604. The user interface 600 includes access elements to an online advertising application and website analytics application for "XYZ-Company.com." In the illustrated instance, the link 606 may be an access element for the online advertising application. The link 606 includes at least one of a graphical image, a name and hyperlinked text. In some instances, where the application 118 may be stored on the application server 101, in response to a user 125 selecting the link 606 the access request engine 208 transmits a request to the application 118 to generate the requested information, which the graphical user interface engine 210 displays in the user interface as illustrated in FIG. 6B.

Figure 6B:
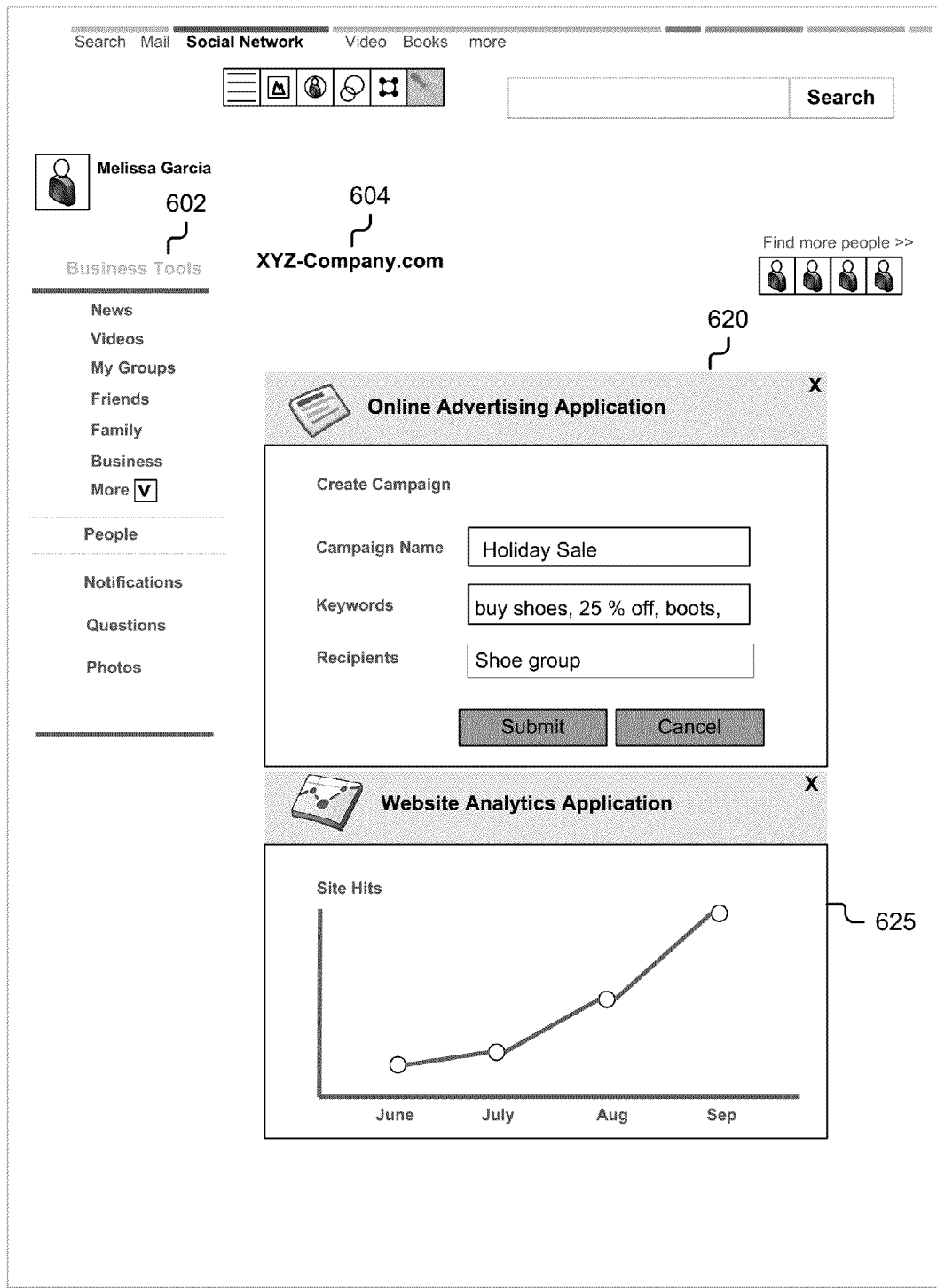
FIG. 6B is a graphic representation of example widgets.

Turning to FIG. 6B, another example of a graphic representation of user interface 600 generated by the graphical user interface engine 210 is illustrated. The user interface 600 displays links 602 for managing the business tool account. In this example, the user interface 600 includes an online advertising application 620 and a website analytics application 625 that may be associated with company 604. For the online advertising application 620, the user 125 specifies an advertising campaign with a campaign name, keywords and recipients of the advertisement. The website analytics application 625 illustrates a number of users 125 that visited the business page as a function of time.

In some instances, the application can be self-executing or embedded code that is part of the social network. In some instances, the application can be stored on the application server 101 and performs the processing steps on the application server 101.

Figure 7:
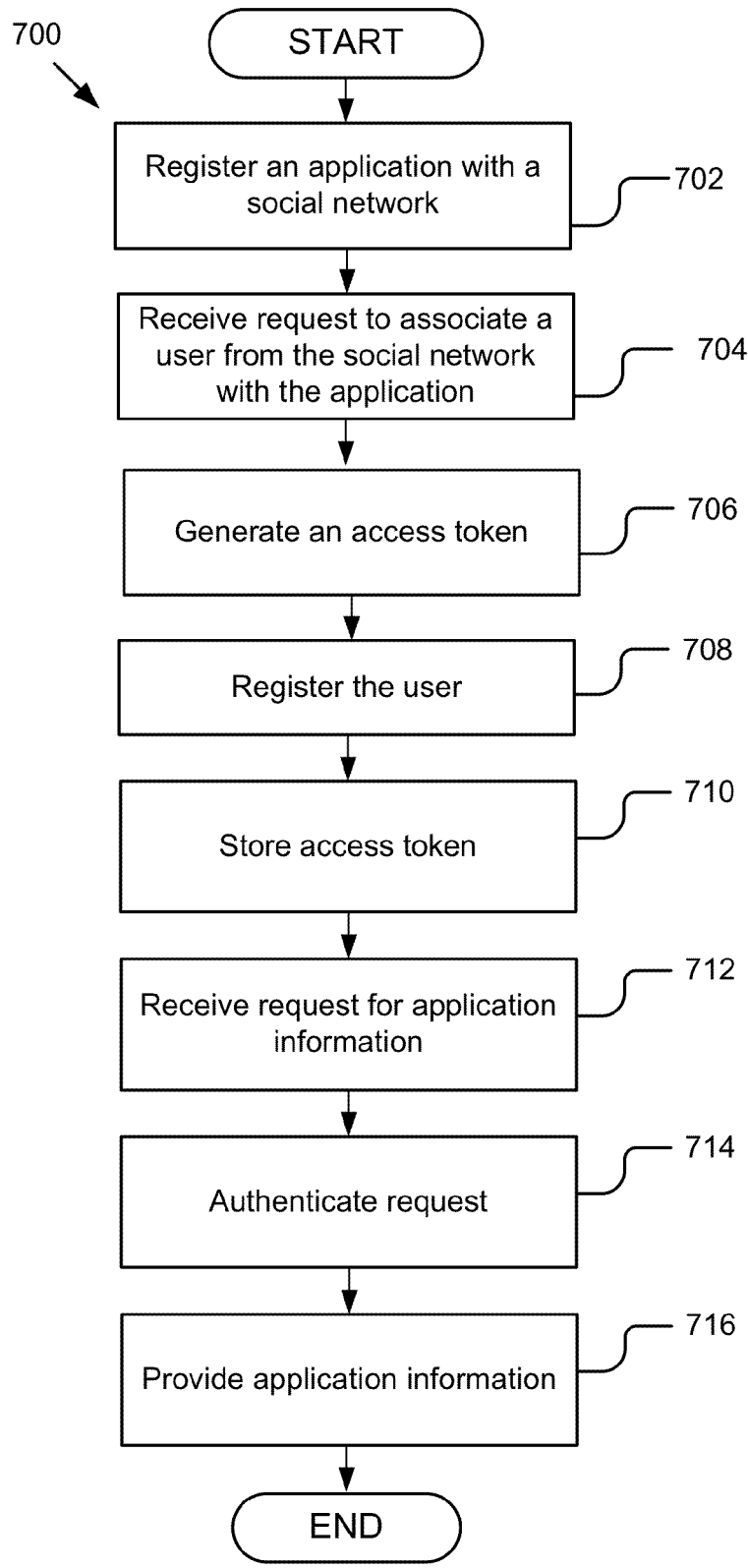
FIG. 7 is a flow diagram of an example method for providing permission to access a business tool account.
Figure 8:
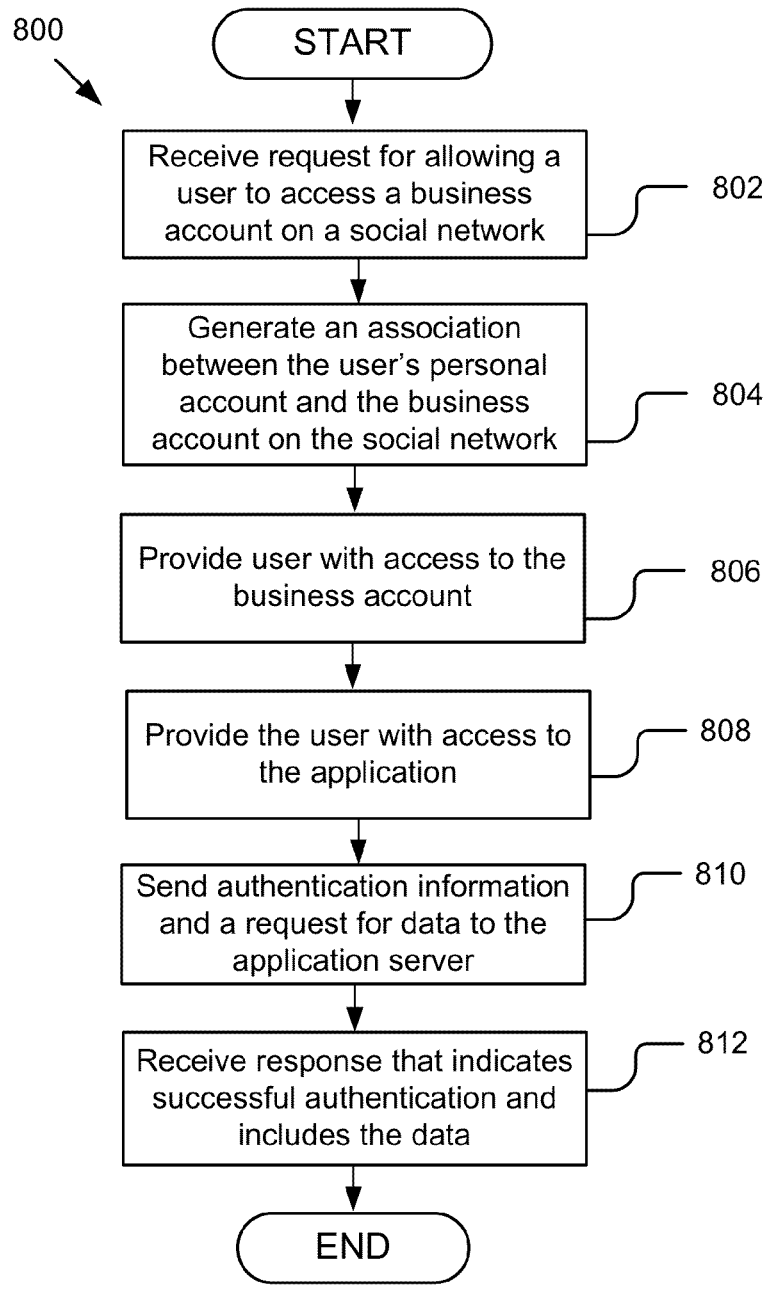
FIG. 8 is a flow diagram of an example method for accessing a business tool account.

FIGS. 7 and 8 depict various methods 700, 800 performed by the system described above with reference to FIGS. 1-3.

FIG. 7 is a flow diagram of one instance of a method 700 for providing permission to access an application 118 stored on the application server 101 that is associated with a business tool account on the social network. An authentication management module 107 includes a subscriber engine 303, a token generator engine 304 and an authenticating engine 306. The subscriber engine 303 registers 702 an application 118 with the social network. For example, the subscriber engine 303 provides the social network with a title of the application, keywords, a short description, etc. In some instances, the social network returns a unique identifier that the subscriber engine 303 associates with the application 118 that can be provided to identify the application 118 with the social network.

The subscriber engine 303 receives 704 a request to register a user 125 of a social network. In some instances, the request may be received from an administrator 121 on behalf of the user 125. In one instance, the request includes user information, the social networking service and an access level. The subscriber engine 303 transmits the request to the token generator engine 304, which generates 706 the access token and sends the access token to the social network to be used in future communications to identify the user 125. The subscriber engine 303 registers 708 the user 125 by adding the user 125 to a proxy users database 345. The subscriber engine 303 stores 710 the access token in a tokens database 346. In one instance, the subscriber engine 303 stores an association between the access token and at least one of the business tool, the business tools account on the social network and user information in at least one of the proxy users database 345 and tokens database 346.

The authentication management module 107 receives 712 a request for application information from the social network. In some instances, the request includes the access token. The authenticating engine 306 receives the request and authenticates 714 the request and the authenticating engine 306 provides 716 the application information.

FIG. 8 is a flow diagram of one instance of a method 800 for accessing a business tool account on a social network. A proxy access module 103 includes a business registration engine 206, an access request engine 208, an application directory engine 207 and a graphical user interface engine 210. A business registration engine 206 receives 802 a request for allowing a user 125 with a personal account on a social network to also access a business account on the social network. In some instances, the request may be received from an administrator 121 that manages the business account on the social network. In some instances, the request can be received from another user 125 that shares a business tool and/or access to the business tool account with the user 125 on the social network. In another instance, the business tool can be shared with a group of users 125 on a social networking online service. Sharing the business tool provides access to the members of the group. In some instances, the social network application 204 generates a group on the social network, for example, a group of employees of the company associated with the business account and the administrator 121 requests the business registration engine 206 to allow the group of users 125 to access the business account.

In some instances, the request includes details about which applications 118 that may be part of the business account that the user 125 has permission to access. For example, the user 125 may have permission to access a subset of applications associated with the business account based on an access level. In some instances, the access level may be based on whether the user 125 is an employee or an affiliate of the business. The business registration engine 206 generates 804 an association between the user's 125 personal account and the business account on the social network and registers the user 125 with the application server 101. The business registration engine 206 receives a token from the application server 101 that is associated with the user 125 and stores the token in a tokens database 246. The business registration engine 206 stores the association between the user 125 and the business account in the registered users file 245 in data storage 215.

The application directory engine 207 provides 806 the user 125 with access to the account of the business tool after determining that the user 125 is authorized to access the application 118. For example, the application directory engine 207 compares the user 125 to the list of registered users 245 to confirm that the user 125 has permission to access the application 118. The graphical user interface engine 210 provides 808 the user 125 with access to the application 118. For example, the graphical user interface engine 210 generates graphical data for displaying the application 118 or displaying a portal for accessing the application 118. In some instances, the graphical user interface engine 201 generates graphical data for displaying a subset of business tools including the application 118 associated with a business tool account.

The access request engine 208 sends 810 authentication information and a request for data to the application server 101. In some instances, the authentication information includes the token. The access request engine 208 receives 812 a response that indicates successful authentication and includes the data. In one instance, the access request engine 208 instructs the graphical user interface engine 210 to generate graphical data for displaying the data from the application 118.

In the above description, for purposes of explanation, numerous specific details are set forth in order to provide a thorough understanding of the specification. It will be apparent, however, that the instances can be practiced without these specific details. In other instances, structures and devices are shown in block diagram form in order to avoid obscuring the description. For example, the present instance can be described in one instance below primarily with reference to user interfaces and particular hardware. However, the present instance applies to any type of computing device that can receive data and commands, and any peripheral devices providing services.

Reference in the specification to "one instance" or "an instance" means that a particular feature, structure, or characteristic described in connection with the instance is included in at least one instance of the description. The appearances of the phrase "in one instance" in various places in the specification are not necessarily all referring to the same instance.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware instance, an entirely software instance or an instance containing both hardware and software elements. In a preferred instance, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the instances of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   receiving, with one or more processors, a request for allowing a user with a personal account on a social network to also access a business account on the social network, the request including user information, the user information including a user name, an association type, and an access level;
   transmitting, with the one or more processors, a registration request to an application server for associating the user with permission settings for accessing the business tool account and a subset of applications that are integrated into the business tool account,
      wherein the application server generates an access token indicating the permission settings, registers the user, and stores the access token; generating, with the one or more processors, an association between the user's personal account and the business tool account on the social network, wherein generating the association comprises receiving the access token from the application server and associating the access token with the user information;
   receiving, with the one or more processors, a request from the user to access the business tool account in response to the user clicking on a tools icon that is integrated into a graphical user interface associated with the personal account of the user;
   providing the user with single sign-in access to the business tool account on the social network directly from the graphical user interface associated with the personal account of the user through a portal by engaging an icon in the graphical user interface associated with the personal account of the user;
   providing the user with access to the subset of applications integrated into the business tool account based on the association type and the access level directly from the graphical user interface associated with the personal account of the user through the portal;
   transmitting, with the one or more processors, an access request to the application server for accessing application information associated with one of the subset of applications, the access request comprising authentication information including the access token,
      wherein the application server determines whether the user has permission to access the application information by comparing the received access token to the previously stored access token, and generates graphical data for displaying the application information if the user has permission; and
   receiving a response from the application server that indicates successful authentication and includes the graphical data for displaying the requested application information to the user.

2. The method of claim 1, further comprising:
   generating a relationship between the user and other members of the social network; and
   sharing at least one of the applications with at least one of the other members of the social network.

3. The method of claim 1, wherein at least one of the applications is for distributing advertisements in the social network.

4. The method of claim 1, wherein at least one of the applications is a management tool for analyzing a business page on the social network.

5. The method of claim 1, wherein the access level is determined based on whether the user is an employee or an affiliate of the business.

6. A system comprising:
   one or more processors, and;
   a memory storing instructions that, when executed, cause the system to:
      receive a request for allowing a user with a personal account on a social network to also access a business account on the social network, the request including user information, the user information including a user name, an association type, and an access level;
      transmit a registration request to an application server for associating the user with permission settings for accessing the business tool account and a subset of applications that are integrated into the business tool account,
         wherein the application server generates an access token indicating the permission settings, registers the user, and stores the access token;
      generate an association between the user's personal account and the business tool account on the social network, wherein generating the association comprises receiving the access token from the application server and associating the access token with the user information;
      receive a request from the user to access the business tool account in response to the user clicking on a tools icon that is integrated into a graphical user interface associated with the personal account of the user;
      provide the user with single sign-in access to the business tool account on the social network directly from the graphical user interface associated with the personal account of the user through a portal by engaging an icon in the graphical user interface associated with the personal account of the user;
      provide the user with access to the subset of applications integrated into the business tool account based on the association type and the access level directly from the graphical user interface associated with the personal account of the user through the portal
      transmit an access request to the application server for accessing application information associated with one of the subset of applications, the access request comprising authentication information including the access token, wherein the application server determines whether the user has permission to access the application information by comparing the received access token to the previously stored access token, and generates graphical data for displaying the application information if the user has permission; and receive a response from the application server that indicates successful authentication and includes the graphical data for displaying the requested application information to the user.

7. The system of claim 6, wherein the memory, when executed, is further configured to cause the system to:

generate a relationship between the user and other members of the social network; and share at least one of the applications with at least one of the other members of the social network.

8. The system of claim 6, wherein at least one of the applications is for distributing advertisements in the social network.

9. The system of claim 6, wherein at least one of the applications is a management tool for analyzing a business page on the social network.

10. A computer program product comprising a non-transitory computer usable medium including a computer readable program, wherein the computer readable program when executed on a computer causes the computer to perform steps comprising:

receive a request for allowing a user with a personal account on a social network to also access a business account on the social network, the request including user information, the user information including a user name, an association type, and an access level;

transmit a registration request to an application server for associating the user with permission settings for accessing the business tool account and a subset of applications that are integrated into the business tool account, wherein the application server generates an access token indicating the permission settings, registers the user, and stores the access token;

generate an association between the user's personal account and the business tool account on the social network, wherein generating the association comprises receiving the access token from the application server and associating the access token with the user information;

receive a request from the user to access the business tool account in response to the user clicking on a tools icon that is integrated into a graphical user interface associated with the personal account of the user;

provide the user with single sign-in access to the business tool account on the social network directly from the graphical user interface associated with the personal account of the user through a portal by engaging an icon in the graphical user interface associated with the personal account of the user;

provide the user with access to the subset of applications integrated into the business tool account based on the association type and the access level directly from the graphical user interface associated with the personal account of the user through the portal transmit an access request to the application server for accessing application information associated with one of the subset of applications, the access request comprising authentication information including the access token, wherein the application server determines whether the user has permission to access the application information by comparing the received access token to the previously stored access token, and generates graphical data for displaying the application information if the user has permission; and receive a response from the application server that indicates successful authentication and includes the graphical data for displaying the requested application information to the user.

11. The computer program product of claim 10, wherein the computer readable program is further configured to cause the computer to:

generate a relationship between the user and other members of the social network; and share at least one of the applications with at least one of the other members of the social network.

12. The computer program product of claim 10, wherein at least one of the applications is for distributing advertisements in the social network.

13. The computer program product of claim 10, wherein at least one of the applications is a management tool for analyzing a business page on the social network.

14. The computer program product of claim 10, wherein the access level is determined based on whether the user is an employee or an affiliate of the business.

* * * * *